(12) United States Patent
Lin

(10) Patent No.: US 11,238,667 B2
(45) Date of Patent: Feb. 1, 2022

(54) MODIFICATION OF ANIMATED CHARACTERS

(71) Applicant: Roblox Corporation, San Mateo, CA (US)

(72) Inventor: JyHuey Lin, Sunnyvale, CA (US)

(73) Assignee: Roblox Corporation, San Mateo, CA (US)

( * ) Notice: Subject to any disclaimer, the term of this patent is extended or adjusted under 35 U.S.C. 154(b) by 8 days.

(21) Appl. No.: 16/936,183

(22) Filed: Jul. 22, 2020

(65) Prior Publication Data

US 2020/0364945 A1 Nov. 19, 2020
US 2021/0319628 A9 Oct. 14, 2021

Related U.S. Application Data

(63) Continuation of application No. 16/416,014, filed on May 17, 2019, now Pat. No. 10,748,350.

(51) Int. Cl.
*G06T 19/00* (2011.01)
*G06T 19/20* (2011.01)
*G06T 13/40* (2011.01)

(52) U.S. Cl.
CPC .............. *G06T 19/20* (2013.01); *G06T 13/40* (2013.01); *G06T 2219/2004* (2013.01); *G06T 2219/2016* (2013.01); *G06T 2219/2021* (2013.01)

(58) Field of Classification Search
None
See application file for complete search history.

(56) References Cited

U.S. PATENT DOCUMENTS

| 8,830,241 | B1* | 9/2014 | Gorner | G06T 9/008 |
| | | | | 345/467 |
| 10,068,362 | B2* | 9/2018 | Takafuji | G06F 3/011 |
| 2001/0046310 | A1* | 11/2001 | Shima | G08B 17/125 |
| | | | | 382/107 |
| 2008/0238927 | A1* | 10/2008 | Mansfield | G06T 11/60 |
| | | | | 345/467 |
| 2008/0309677 | A1* | 12/2008 | Fleury | G06T 13/40 |
| | | | | 345/630 |

(Continued)

OTHER PUBLICATIONS

WIPO, International Search Report for International Patent Application No. PCT/US2019/051801, 2 Pages.

(Continued)

*Primary Examiner* — Martin Mushambo
(74) *Attorney, Agent, or Firm* — IP Spring

(57) ABSTRACT

Some implementations relate to modification and display of game characters. In some implementations, a computer-implemented method to update a displayed character includes providing a user interface with endpoints, an input area enclosed by a plurality of lines, and a preview area that includes the displayed character. Each endpoint is associated with a corresponding type of character. Each line of the plurality of lines connects two adjacent endpoints. The method further includes receiving user input that is indicative of a particular position within the input area, in response to receiving the user input, determining a size of one or more body parts of the displayed character based on the position, and updating the displayed character in the preview area based on the determined size of the one or more body parts of the displayed character.

20 Claims, 10 Drawing Sheets

(56) References Cited

U.S. PATENT DOCUMENTS

| | | | |
|---|---|---|---|
| 2010/0026698 A1 | 2/2010 | Reville et al. | |
| 2013/0342527 A1* | 12/2013 | Molyneaux | G06T 17/20 |
| | | | 345/419 |
| 2014/0168217 A1* | 6/2014 | Kim | G06Q 30/0643 |
| | | | 345/420 |
| 2016/0292770 A1* | 10/2016 | Alselimi | G06Q 30/0631 |
| 2018/0165864 A1* | 6/2018 | Jin | G06F 3/017 |

OTHER PUBLICATIONS

WIPO, Written Opinion for International Patent Application No. PCT/US2019/051801, 6 Pages.
USPTO, Notice of Allowance for U.S. Appl. No. 16/416,014, dated Apr. 17, 2020, 8 pages.
USPTO, Ex Parte Quayle Action for U.S. Appl. No. 16/416,014, Jan. 2, 2020, 10 pages.

* cited by examiner

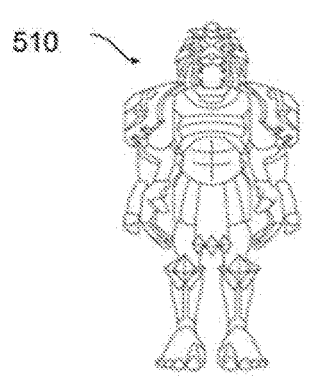
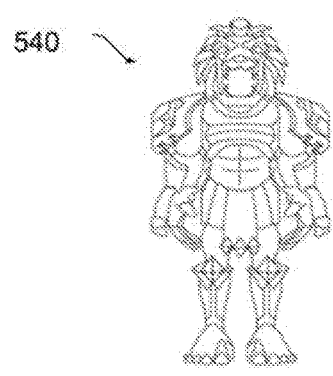
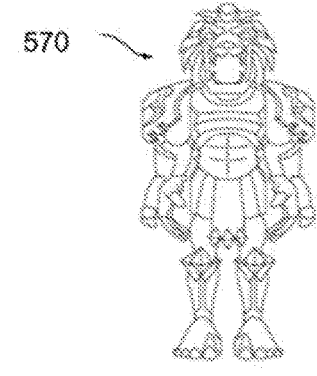
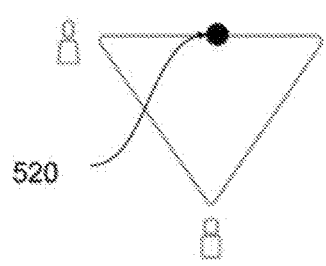
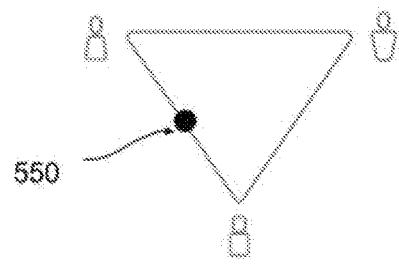
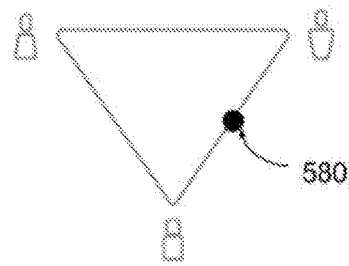
FIG. 5A      FIG. 5B      FIG. 5C

MODIFICATION OF ANIMATED CHARACTERS

CROSS-REFERENCE TO RELATED APPLICATIONS

The present application is a continuation of and claims priority to U.S. patent application Ser. No. 16/416,014, filed on May 17, 2019 and titled "MODIFICATION OF ANIMATED CHARACTERS," the contents of which are fully incorporated herein by reference.

TECHNICAL FIELD

Embodiments relate generally to computer based gaming, and more particularly, to methods, systems, and computer readable media for modification and display of game characters in computer enabled games.

BACKGROUND

Some online gaming platforms, allow users to connect with each other, interact with each other (e.g., within a game), and/or share information with each other via the Internet. Users of online gaming platforms may participate in multiplayer gaming environments (e.g., in virtual two-dimensional or three-dimensional environments), design custom gaming environments, design characters and avatars, decorate avatars, exchange virtual items with other users, communicate with other users using audio, video, or text messaging, and so forth.

Some implementations were conceived in light of the above-mentioned needs, among other things.

SUMMARY

Implementations described herein relate to modification and display of game characters. In some implementations, a computer-implemented method to update a displayed character includes providing a user interface that includes at least three endpoints and a preview area that includes the displayed character. In at least some of the implementations, each endpoint of the at least three endpoints is associated with a corresponding type of character and an input area enclosed by a plurality of lines. In at least some of the implementations, each line of the plurality of lines connects two adjacent endpoints of the at least three endpoints.

In some implementations, the method includes receiving user input that is indicative of a particular position within the input area, in response to receiving the user input, determining a size of one or more body parts of the displayed character based on the position, and updating the displayed character in the preview area based on the determined size of the one or more body parts of the displayed character. In some implementations, the input area is defined by a triangle, and each vertex of the triangle corresponds to a respective endpoint of the at least three endpoints.

In some implementations, determining the size of the one or more body parts based on the position comprises selecting a respective size of the one or more body parts based on a respective distance between the position and the at least three endpoints. In some implementations, determining the size comprises determining at least one of a length or a girth of the one or more body parts.

In some implementations, the at least three endpoints include a first endpoint associated with an anthro-female character, a second endpoint associated with an anthro-male character, and a third endpoint associated with a minifig character.

In some implementations, updating the displayed character comprises adjusting a texture of the displayed character. In some implementations, adjusting the texture comprises adjusting at least one of a lightness transition or a color transition.

In some implementations, the displayed character comprises the one or more body parts connected in a three-dimensional rig with 15 joints.

In some implementations, determining the size of one or more body parts of the displayed character comprises determining a respective distance between the position and each of the endpoints, and determining the size of the one or more parts based on a weighted average of a respective size of the one or more body parts of the respective type of character associated with each endpoint.

In at least some implementations, determining the size of one or more body parts of the displayed character comprises calculating a respective weighted size associated with each endpoint based on a respective distance between the position and the endpoint and calculating the weighted average as a simple average of the respective weighted size associated with each endpoint.

In some implementations, determining a size of one or more body parts of the displayed character based on the position comprises determining a distance between the position and a previous position and determining the size of one or more body parts of the displayed character based on the distance and a size of the corresponding one or more body parts of the displayed character at the previous position.

In some implementations, the method includes storing a size of one or more body parts of the displayed character associated with a plurality of predetermined positions within the input area. In at least some implementations, determining a size of one or more body parts of the displayed character based on the position comprises determining a distance between the position and at least one of the predetermined positions and determining the size of one or more body parts of the displayed character based on the distance and the size of the corresponding one or more body parts of the displayed character at least one of the predetermined positions.

Some implementations include a system comprising a memory with instructions stored thereon and a processing device, coupled to the memory, the processing device configured to access the memory and execute the instructions, that cause the processing device to perform operations that include providing a user interface that includes at least three endpoints, an input area enclosed by a plurality of lines, and a preview area that includes a displayed character. In at least some implementations, each endpoint of the at least three endpoints is associated with a corresponding type of character. In at least some implementations, each line of the plurality of lines connects two adjacent endpoints of the at least three endpoints. In some implementations, the operations include receiving user input that is indicative of a particular position within the input area, in response to receiving the user input, determining a size of one or more body parts of the displayed character based on the position, and updating the displayed character in the preview area based on the determined size of the one or more body parts of the displayed character.

In some implementations, determining the size of the one or more body parts based on the position comprises selecting a respective size of the one or more body parts based on a respective distance between the position and the at least three endpoints. In some implementations, the at least three endpoints include a first endpoint associated with an anthro-female character, a second endpoint associated with an anthro-male character, and a third endpoint associated with a minifig character.

Some implementations include a non-transitory computer-readable medium comprising instructions that, responsive to execution by a processing device, cause the processing device to perform operations comprising providing a user interface that includes a user interface that includes at least three endpoints, an input area enclosed by a plurality of lines, and a preview area that includes a displayed character.

In at least some implementations, each endpoint of the at least three endpoints is associated with a corresponding type of character. In at least some implementations, each line of the plurality of lines connects two adjacent endpoints of the at least three endpoints.

In some implementations, the operations include receiving user input that is indicative of a particular position within the input area, in response to receiving the user input, determining a size of one or more body parts of the displayed character based on the position, and updating the displayed character in the preview area based on the determined size of the one or more body parts of the displayed character.

In some implementations, determining the size of one or more body parts of the displayed character comprises determining a respective distance between the position and each of the endpoints and determining the size of the one or more parts based on a weighted average of a respective size of the one or more body parts of the respective type of character associated with each endpoint.

In some implementations, the input area is defined by a triangle, and each vertex of the triangle corresponds to a respective endpoint of the at least three endpoints. In some implementations, the at least three endpoints include a first endpoint associated with an anthro-female character, a second endpoint associated with an anthro-male character, and a third endpoint associated with a minifig character.

BRIEF DESCRIPTION OF THE DRAWINGS

FIGS. 5A, 5B, and 5C illustrate additional positions indicated by user input and corresponding displayed characters, according to some implementations.

DETAILED DESCRIPTION

Online gaming platforms (also referred to as "user-generated content platforms" or "user-generated content systems") offer a variety of ways for users to interact with one another. For example, users of an online gaming platform may work together towards a common goal, share various virtual gaming items, send electronic messages to one another, and so forth. Users of an online gaming platform may join games as virtual characters, playing game-specific roles. For example, a virtual character may be part of a team or multiplayer environment wherein each character is assigned a certain role and has associated parameters, e.g., clothing, armor, weaponry, skills, etc. that correspond to the role. In another example, a virtual character may be joined by computer-generated characters, e.g., when a single player is part of a game.

An online gaming platform may also allow users of the platform to create and animate new characters and avatars. For example, users of the online gaming platform may be enabled to create, design, and customize new characters.

In some implementations, animation may include characters that move one or more body parts to simulate movement such as walking, running, jumping, dancing, fighting, wielding a weapon such as a sword, etc. In some implementations, characters may generate facial expressions, where a part of or an entire body of the character moves. Animations may correspond to various movements, e.g. graceful, warrior-like, balletic, etc., and may mimic the movement of popular real and fictional characters.

Figure 1:
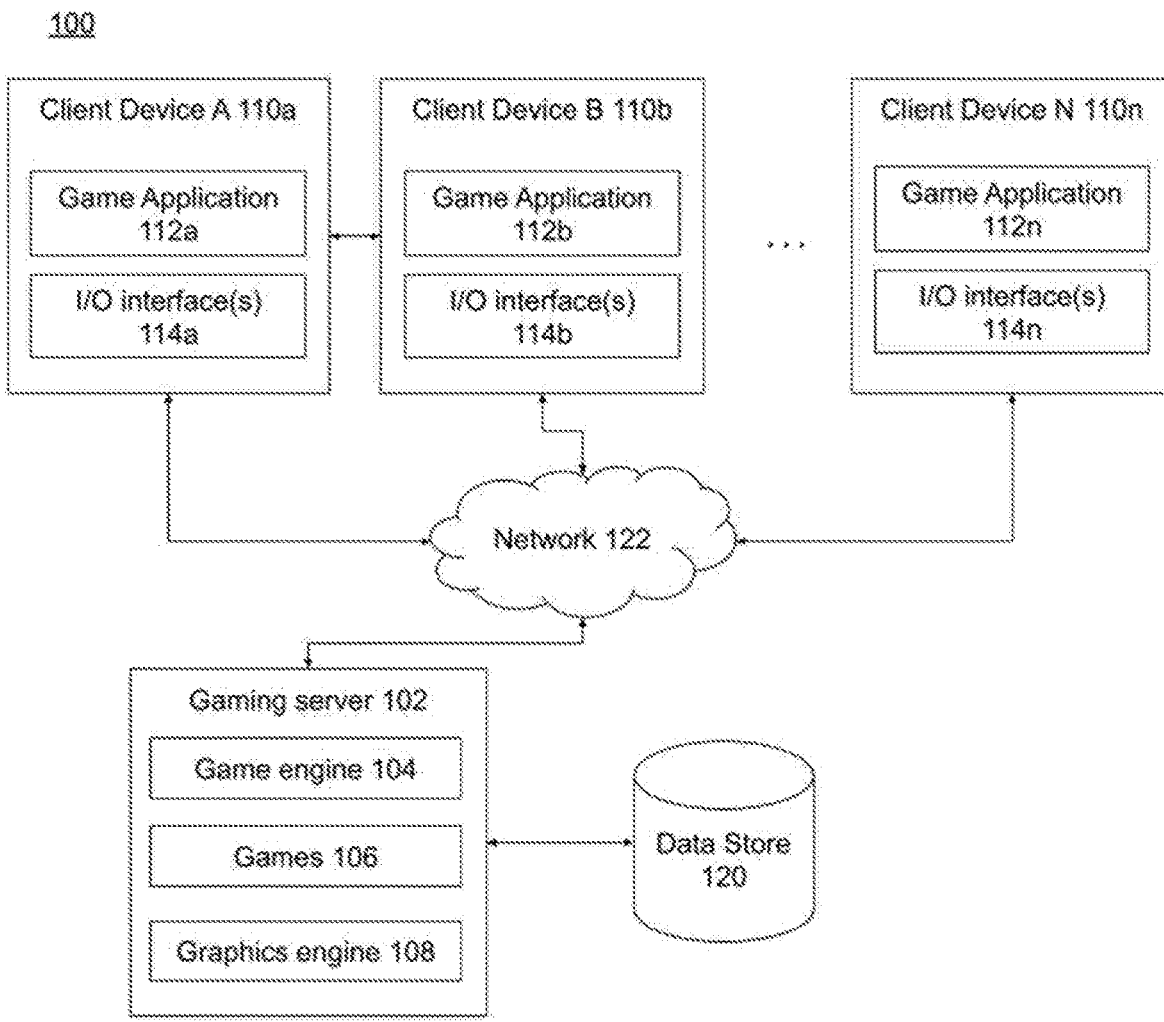
FIG. 1 is a diagram of an example system architecture for character modification, in accordance with some implementations.

FIG. 1 illustrates an example system architecture 100, in accordance with some implementations of the disclosure. FIG. 1 and the other figures use like reference numerals to identify like elements. A letter after a reference numeral, such as "110," indicates that the text refers specifically to the element having that particular reference numeral. A reference numeral in the text without a following letter, such as "110," refers to any or all of the elements in the figures bearing that reference numeral (e.g. "110" in the text refers to reference numerals "110a," "110b," and/or "110n" in the figures).

The system architecture 100 (also referred to as "system" herein) includes online gaming server 102, data store 120, and client devices 110a, 110b, and 110n (generally referred to as "client device(s) 110" herein). Gaming server 102, data store 120, and client devices 110 are coupled via network 122.

Online gaming server 102 can include, among other things, a game engine 104, one or more games 106, and graphics engine 108. A client device 110 can include a game application 112, and input/output (I/O) interfaces 114 (e.g., input/output devices). The input/output devices can include one or more of a microphone, speakers, headphones, display device, mouse, keyboard, game controller, touchscreen, virtual reality consoles, etc.

System architecture 100 is provided for illustration. In different implementations, the system architecture 100 may include the same, fewer, more, or different elements configured in the same or different manner as that shown in FIG. 1.

In some implementations, network 122 may include a public network (e.g., the Internet), a private network (e.g., a local area network (LAN) or wide area network (WAN)), a wired network (e.g., Ethernet network), a wireless network (e.g., an 802.11 network, a Wi-Fi® network, or wireless LAN (WLAN)), a cellular network (e.g., a 5G network, a Long Term Evolution (LTE) network, etc.), routers, hubs, switches, server computers, or a combination thereof In some implementations, the data store 108 may be a non-transitory computer readable memory (e.g., random access memory), a cache, a drive (e.g., a hard drive), a flash drive, a database system, or another type of component or device capable of storing data. The data store 108 may also include multiple storage components (e.g., multiple drives or multiple databases) that may also span multiple computing devices (e.g., multiple server computers).

In some implementations, the online gaming server 102 can include a server having one or more computing devices (e.g., a cloud computing system, a rackmount server, a server computer, cluster of physical servers, etc.). In some implementations, the online gaming server 102 may be an independent system, may include multiple servers, or be part of another system or server.

In some implementations, the online gaming server 102 may include one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, and/or hardware components that may be used to perform operations on the online gaming server 102 and to provide a user with access to online gaming server 102. The online gaming server 102 may also include a web site (e.g., a webpage) or application back-end software that may be used to provide a user with access to content provided by online gaming server 102. For example, users may access online gaming server 102 using the game application 112 on client devices 110.

In some implementations, online gaming server 102 may be a type of social network providing connections between users or a type of user-generated content system that allows users (e.g., end-users or consumers) to communicate with other users on the online gaming server 102, where the communication may include voice chat (e.g., synchronous and/or asynchronous voice communication), video chat (e.g., synchronous and/or asynchronous video communication), or text chat (e.g., synchronous and/or asynchronous text-based communication). In some implementations of the disclosure, a "user" may be represented as a single individual. However, other implementations of the disclosure encompass a "user" (e.g., creating user) being an entity controlled by a set of users or an automated source. For example, a set of individual users federated as a community or group in a user-generated content system may be considered a "user."

In some implementations, online gaming server 102 may be a virtual gaming server. For example, the gaming server may provide single-player or multiplayer games to a community of users that may access or interact with games using client devices 110 via network 122. In some implementations, games (also referred to as "video game," "online game," or "virtual game" herein) may be two-dimensional (2D) games, three-dimensional (3D) games (e.g., 3D user-generated games), virtual reality (VR) games, or augmented reality (AR) games, for example. In some implementations, users may participate in gameplay with other users. In some implementations, a game may be played in real-time with other users of the game.

In some implementations, gameplay may refer to the interaction of one or more players using client devices (e.g., 110) within a game (e.g., 106) or the presentation of the interaction on a display or other output device (e.g., 114) of a client device 110.

In some implementations, a game 106 can include an electronic file that can be executed or loaded using software, firmware or hardware configured to present the game content (e.g., digital media item) to an entity. In some implementations, a game application 112 may be executed and a game 106 rendered in connection with a game engine 104. In some implementations, a game 106 may have a common set of rules or common goal, and the environments of a game 106 share the common set of rules or common goal. In some implementations, different games may have different rules or goals from one another.

In some implementations, games may have one or more environments (also referred to as "gaming environments" or "virtual environments" herein) where multiple environments may be linked. An example of an environment may be a three-dimensional (3D) environment. The one or more environments of a game application 106 may be collectively referred to a "world" or "gaming world" or "virtual world" or "universe" herein. An example of a world may be a 3D world of a game 106. For example, a user may build a virtual environment that is linked to another virtual environment created by another user. A character of the virtual game may cross the virtual border to enter the adjacent virtual environment.

It may be noted that 3D environments or 3D worlds use graphics that use a three-dimensional representation of geometric data representative of game content (or at least present game content to appear as 3D content whether or not 3D representation of geometric data is used). 2D environments or 2D worlds use graphics that use two-dimensional representation of geometric data representative of game content.

In some implementations, the online gaming server 102 can host one or more games 106 and can permit users to interact with the games 106 using a game application 112 of client devices 110. Users of the online gaming server 102 may play, create, interact with, or build games 106, communicate with other users, and/or create and build objects (e.g., also referred to as "item(s)" or "game objects" or "virtual game item(s)" herein) of games 106. For example, in generating user-generated virtual items, users may create characters, decoration for the characters, one or more virtual environments for an interactive game, or build structures used in a game 106, among others. In some implementations, users may buy, sell, or trade game virtual game objects, such as in-platform currency (e.g., virtual currency), with other users of the online gaming server 102. In some implementations, online gaming server 102 may transmit game content to game applications (e.g., 112). In some implementations, game content (also referred to as "content" herein) may refer to any data or software instructions (e.g., game objects, game, user information, video, images, commands, media item, etc.) associated with online gaming server 102 or game applications. In some implementations, game objects (e.g., also referred to as "item(s)" or "objects" or "virtual game item(s)" herein) may refer to objects that are used, created, shared or otherwise depicted in game applications 106 of the online gaming server 102 or game applications 112 of the client devices 110. For example, game objects may include a part, model, character, tools, weapons, clothing, buildings, vehicles, currency, flora, fauna, components of the aforementioned (e.g., windows of a building), and so forth.

It may be noted that the online gaming server 102 hosting games 106, is provided for purposes of illustration, rather than limitation. In some implementations, online gaming server 102 may host one or more media items that can include communication messages from one user to one or more other users. Media items can include, but are not limited to, digital video, digital movies, digital photos, digital music, audio content, melodies, website content, social media updates, electronic books, electronic magazines, digital newspapers, digital audio books, electronic journals, web blogs, real simple syndication (RSS) feeds, electronic comic books, software applications, etc. In some implementations, a media item may be an electronic file that can be executed or loaded using software, firmware or hardware configured to present the digital media item to an entity.

In some implementations, a game 106 may be associated with a particular user or a particular group of users (e.g., a private game), or made widely available to users with access to the online gaming server 102 (e.g., a public game). In some implementations, where online gaming server 102 associates one or more games 106 with a specific user or group of users, online gaming server 102 may associated the specific user(s) with a game 102 using user account information (e.g., a user account identifier such as username and password).

In some implementations, online gaming server 102 or client devices 110 may include a game engine 104 or game application 112. In some implementations, game engine 104 may be used for the development or execution of games 106. For example, game engine 104 may include a rendering engine ("renderer") for 2D, 3D, VR, or AR graphics, a physics engine, a collision detection engine (and collision response), sound engine, scripting functionality, animation engine, artificial intelligence engine, networking functionality, streaming functionality, memory management functionality, threading functionality, scene graph functionality, or video support for cinematics, among other features. The components of the game engine 104 may generate commands that help compute and render the game (e.g., rendering commands, collision commands, physics commands, etc.) In some implementations, game applications 112 of client devices 110/116, respectively, may work independently, in collaboration with game engine 104 of online gaming server 102, or a combination of both.

In some implementations, both the online gaming server 102 and client devices 110 may execute a game engine (104 and 112, respectively). The online gaming server 102 using game engine 104 may perform some or all the game engine functions (e.g., generate physics commands, rendering commands, etc.), or offload some or all the game engine functions to game engine 104 of client device 110. In some implementations, each game 106 may have a different ratio between the game engine functions that are performed on the online gaming server 102 and the game engine functions that are performed on the client devices 110. For example, the game engine 104 of the online gaming server 102 may be used to generate physics commands in cases where there is a collision between at least two game objects, while the additional game engine functionality (e.g., generate rendering commands) may be offloaded to the client device 110. In some implementations, the ratio of game engine functions performed on the online gaming server 102 and client device 110 may be changed (e.g., dynamically) based on gameplay conditions. For example, if the number of users participating in gameplay of a particular game 106 exceeds a threshold number, the online gaming server 102 may perform one or more game engine functions that were previously performed by the client devices 110.

For example, users may be playing a game 106 on client devices 110, and may send control instructions (e.g., user inputs, such as right, left, up, down, user election, or character position and velocity information, etc.) to the online gaming server 102. Subsequent to receiving control instructions from the client devices 110, the online gaming server 102 may send gameplay instructions (e.g., position and velocity information of the characters participating in the group gameplay or commands, such as rendering commands, collision commands, etc.) to the client devices 110 based on control instructions. For instance, the online gaming server 102 may perform one or more logical operations (e.g., using game engine 104) on the control instructions to generate gameplay instruction for the client devices 110. In other instances, online gaming server 102 may pass one or more or the control instructions from one client device 110 to other client devices (e.g., from client device 110a to client device 110b) participating in the game 106. The client devices 110 may use the gameplay instructions and render the gameplay for presentation on the displays of client devices 110.

In some implementations, the control instructions may refer to instructions that are indicative of in-game actions of a user's character. For example, control instructions may include user input to control the in-game action, such as right, left, up, down, user selection, gyroscope position and orientation data, force sensor data, etc. The control instructions may include character position and velocity information. In some implementations, the control instructions are sent directly to the online gaming server 102. In other implementations, the control instructions may be sent from a client device 110 to another client device (e.g., from client device 110b to client device 110n), where the other client device generates gameplay instructions using the local game engine 104. The control instructions may include instructions to play a voice communication message or other sounds from another user on an audio device (e.g., speakers, headphones, etc.), for example voice communications or other sounds generated using the audio spatialization techniques as described herein.

In some implementations, gameplay instructions may refer to instructions that allow a client device 110 to render gameplay of a game, such as a multiplayer game. The gameplay instructions may include one or more of user input (e.g., control instructions), character position and velocity information, or commands (e.g., physics commands, rendering commands, collision commands, etc.).

In some implementations, characters (or game objects generally) are constructed from components, one or more of which may be selected by the user, that automatically join together to aid the user in editing. One or more characters (also referred to as an "avatar" or "model" herein) may be associated with a user where the user may control the character to facilitate a user's interaction with the game 106. In some implementations, a character may include components such as body parts (e.g., hair, arms, legs, etc.) and accessories (e.g., t-shirt, glasses, decorative images, tools, etc.). In some implementations, body parts of characters that are customizable include head type, body part types (arms, legs, torso, and hands), face types, hair types, and skin types, among others. In some implementations, the accessories that are customizable include clothing (e.g., shirts, pants, hats, shoes, glasses, etc.), weapons, or other tools. In some implementations, the user may also control the scale (e.g., height, width, or depth) of a character or the scale of components of a character. In some implementations, the user may control the proportions of a character (e.g., blocky, anatomical, etc.). It may be noted that is some implementations, a character may not include a character game object (e.g., body parts, etc.) but the user may control the character (without the character game object) to facilitate the user's interaction with the game (e.g., a puzzle game where there is no rendered character game object, but the user still controls a character to control in-game action).

In some implementations, a component, such as a body part, may be a primitive geometrical shape such as a block, a cylinder, a sphere, etc., or some other primitive shape such as a wedge, a torus, a tube, a channel, etc. In some implementations, a creator module may publish a user's character for view or use by other users of the online gaming server 102. In some implementations, creating, modifying, or customizing characters, other game objects, games 106, or game environments may be performed by a user using a I/O interface (e.g., developer interface) and with or without scripting (or with or without an application programming interface (API)). It may be noted that for purposes of illustration, rather than limitation, characters are described as having a humanoid form. In may further be noted that characters may have any form such as a vehicle, animal, inanimate object, or other creative form.

In some implementations, the online gaming server 102 may store characters created by users in the data store 108. In some implementations, the online gaming server 102 maintains a character catalog and game catalog that may be presented to users. In some implementations, the game catalog includes images of games stored on the online gaming server 102. In addition, a user may select a character (e.g., a character created by the user or other user) from the character catalog to participate in the chosen game. The character catalog includes images of characters stored on the online gaming server 102. In some implementations, one or more of the characters in the character catalog may have been created or customized by the user. In some implementations, the chosen character may have character settings defining one or more of the components of the character.

In some implementations, a user's character can include a configuration of components, where the configuration and appearance of components and more generally the appearance of the character may be defined by character settings. In some implementations, the character settings of a user's character may at least in part be chosen by the user. In other implementations, a user may choose a character with default character settings or character setting chosen by other users. For example, a user may choose a default character from a character catalog that has predefined character settings, and the user may further customize the default character by changing some of the character settings (e.g., adding a shirt with a customized logo). The character settings may be associated with a particular character by the online gaming server 102.

In some implementations, the client device(s) 110 may each include computing devices such as personal computers (PCs), mobile devices (e.g., laptops, mobile phones, smart phones, tablet computers, or netbook computers), network-connected televisions, gaming consoles, etc. In some implementations, a client device 110 may also be referred to as a "user device." In some implementations, one or more client devices 110 may connect to the online gaming server 102 at any given moment. It may be noted that the number of client devices 110 is provided as illustration. In some implementations, any number of client devices 110 may be used.

In some implementations, each client device 110 may include an instance of the game application 112, respectively. In one implementation, the game application 112 may permit users to use and interact with online gaming server 102, such as control a virtual character in a virtual game hosted by online gaming server 102, or view or upload content, such as games 106, images, video items, web pages, documents, and so forth. In one example, the game application may be a web application (e.g., an application that operates in conjunction with a web browser) that can access, retrieve, present, or navigate content (e.g., virtual character in a virtual environment, etc.) served by a web server. In another example, the game application may be a native application (e.g., a mobile application, app, or a gaming program) that is installed and executes local to client device 110 and allows users to interact with online gaming server 102. The game application may render, display, or present the content (e.g., a web page, a media viewer) to a user. In an implementation, the game application may also include an embedded media player (e.g., a Flash® player) that is embedded in a web page.

According to aspects of the disclosure, the game application may be an online gaming server application for users to build, create, edit, upload content to the online gaming server 102 as well as interact with online gaming server 102 (e.g., play games 106 hosted by online gaming server 102). As such, the game application may be provided to the client device(s) 110 by the online gaming server 102. In another example, the game application may be an application that is downloaded from a server.

In some implementations, a user may login to online gaming server 102 via the game application. The user may access a user account by providing user account information (e.g., username and password) where the user account is associated with one or more characters available to participate in one or more games 106 of online gaming server 102.

In general, functions described in one implementation as being performed by the online gaming server 102 can also be performed by the client device(s) 110, or a server, in other implementations if appropriate. In addition, the functionality attributed to a particular component can be performed by different or multiple components operating together. The online gaming server 102 can also be accessed as a service provided to other systems or devices through appropriate application programming interfaces (APIs), and thus is not limited to use in websites.

In some implementations, online gaming server 102 may include a graphics engine 106. In some implementations, the graphics engine 106 may be a system, application, or module that permits the online gaming server 102 to provide graphics and animation capability. In some implementations, the graphics engine 106 may perform one or more of the operations described below in connection with the flowchart shown in FIG. 4.

Figure 2A:
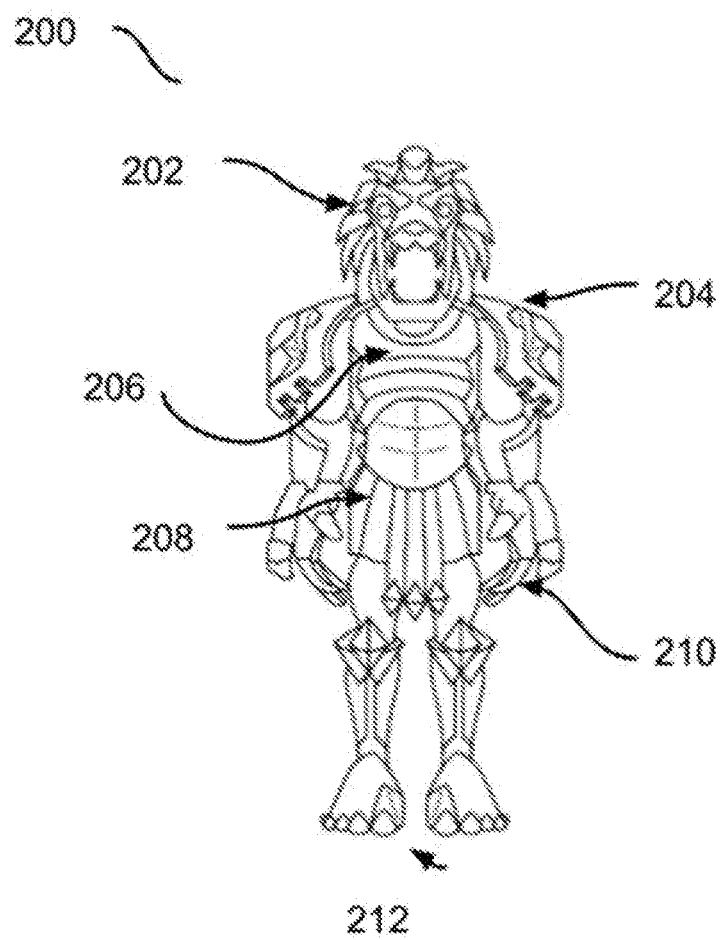
FIG. 2A is a diagram illustrating an example character (avatar) and a user interface that enables a user to perform modification of the character, in accordance with some implementations.

FIG. 2A is a diagram illustrating an example character (avatar) and a user interface that enables a user to perform modification of the character, in accordance with some implementations.

In some implementations, a character may be defined by its features (body parts), which may include a head, shoulders, arms, torso, hips, and legs.

In the illustrative example of FIG. 2A, a character (200) includes features (body parts) such as a head (202), shoulders (204), torso (206), hips (208), a pair of arms (210), and a pair of legs (212).

In some implementations, a character may have any combination of the body parts as listed herein. In some implementations, the character may optionally include textures and accessories. Textures may refer to surface features, e.g., skin type, ski color, hair type, hair color, etc. Accessories may refer to one or more items worn by, carried, or otherwise on the body of the character. For example, accessories may include armor, clothing, weapons, etc.

In some implementations, the character may optionally include body elements and clothing. Body elements may refer to surface features, e.g. skin color, hair style, hair color etc. Outfit may refer to one or more items worn by, carried, or otherwise on the body of the character. For example, outfit may include hats, clothing, accessories, gears, etc.

In some implementations, a template may be utilized for different types of characters. Characters may resemble humans, animals, robots, birds, and other real and imaginary objects/creatures.

Figure 2B:
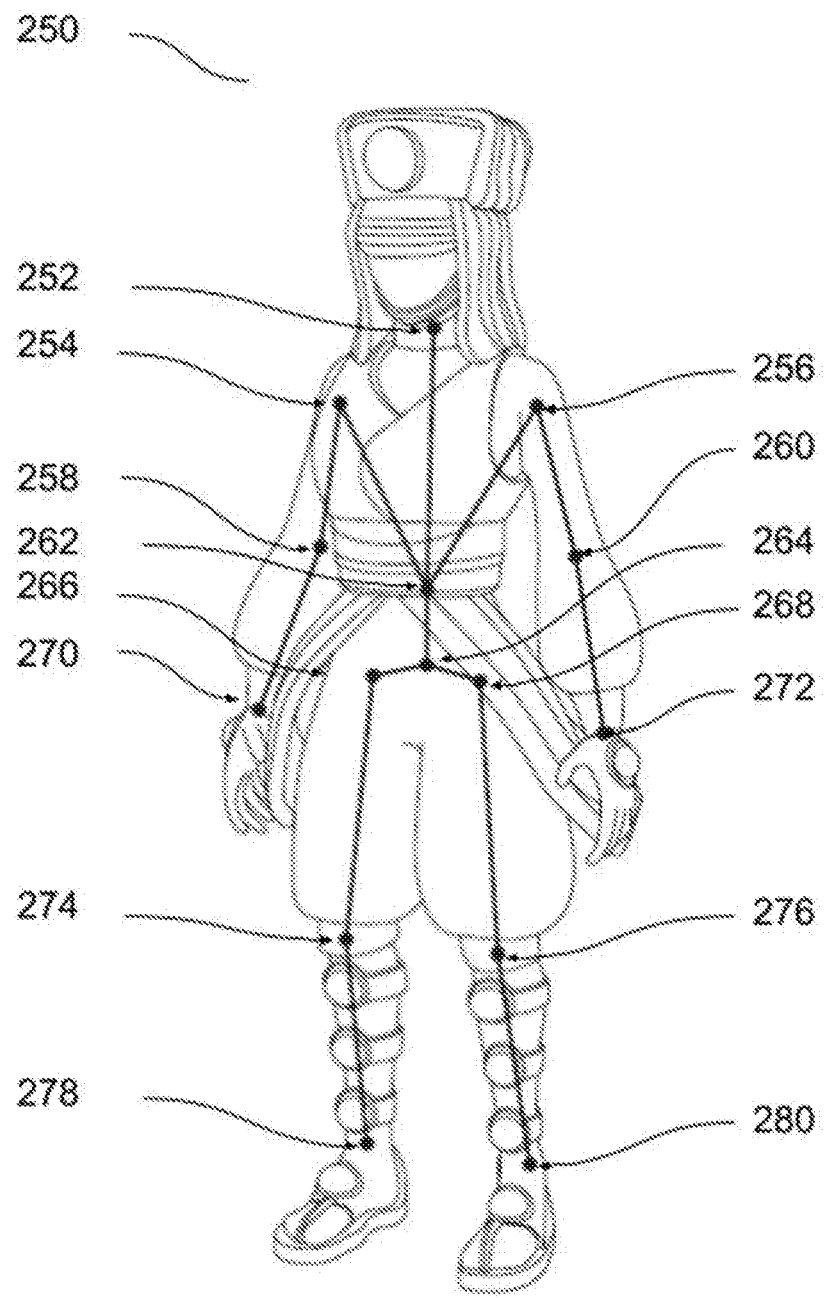
FIG. 2B is a diagram illustrating a three dimensional (3D) example skeleton (rig), in accordance with some implementations.

FIG. 2B is a diagram illustrating a three dimensional (3D) example skeleton (rig), in accordance with some implementations.

In some implementations, a character is implemented as a 3D model and includes a representation of a surface representation used to draw the character (also known as a skin or mesh) and a hierarchical set of interconnected bones (also known as a skeleton or rig). The rig may be utilized to animate the character and to simulate motion and action by the character. The 3D model may be represented as a data structure, and one or more parameters of the data structure may be modified to change various properties of the character, e.g., dimensions (height, width, girth, etc.); body type; movement style; number/ type of body parts; proportion (e.g. shoulder and hip ratio); head size; etc.

In the illustrative example depicted in FIG. 2B, the character includes a rig with 15 points. The rig includes points that represent the head (252), upper right arm (254), upper left arm (256), lower right arm (258), lower left arm (260), upper torso (262), lower torso (264), upper right leg (266), upper left leg (268), right hand (270), left hand (272), lower right leg (274), lower left leg (276), right foot (278), and left foot (280).

In some implementations, the body parts of a character may be connected by a mesh that provides a definition for a shape of the character. In some implementations, additional patterns and/or textures may be added to the character. In some implementations, the character may be augmented with accessories, e.g., for example, tools, weapons, etc.

In some implementations, dimensions of body parts, layout of rig points, distance between the points, etc. are provided by a user at a time of set-up. In some implementations, predetermined dimensions (via examples, libraries, etc.) may be provided to the user for selection. In various implementations, relative distances between the body parts may be adjusted to achieve a particular type of character. For example, different proportions of distances, e.g., shoulder to hip ratio, may be associated with characters that are more similar to a male form (male like) or more similar to a female form (female like). Similarly, parameters such as head size, width, or height may be selected to generate a character with different body proportions.

Figure 2C:
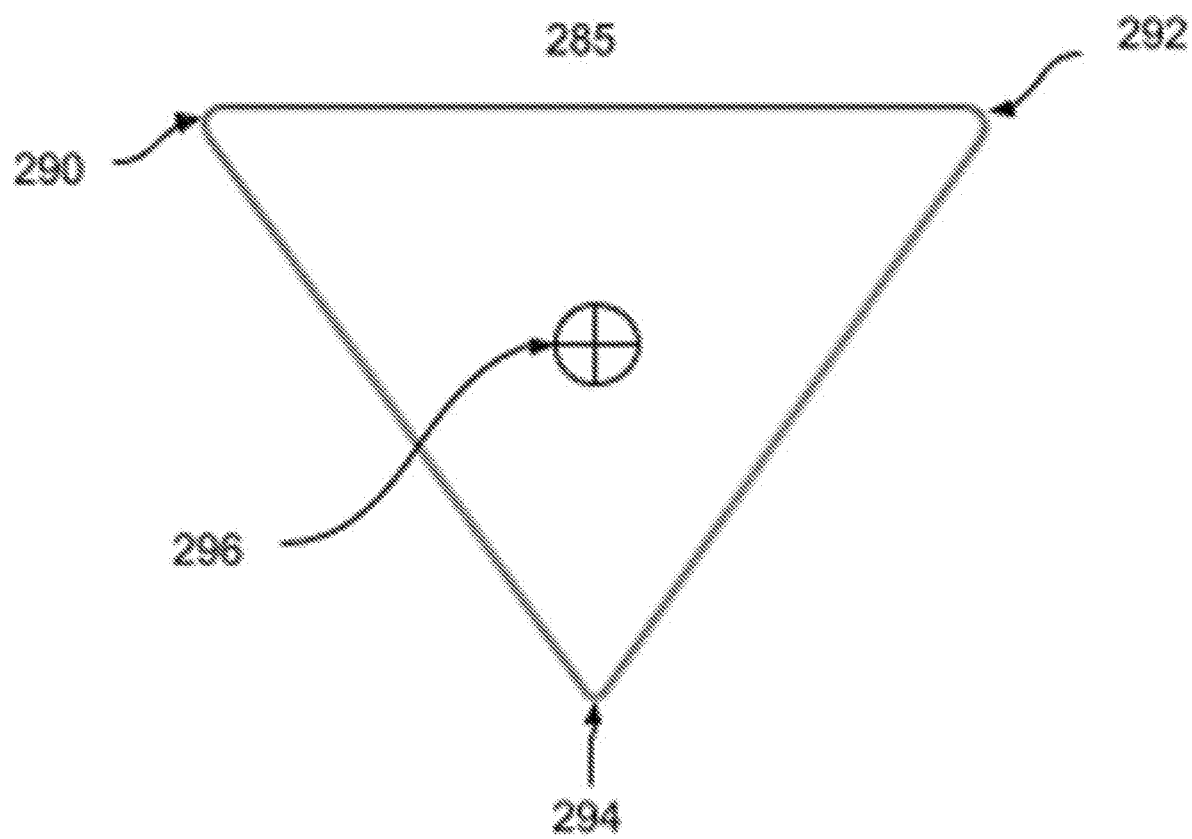
FIG. 2C is a diagram illustrating an example user interface that enables a user to specify a type of displayed character, in accordance with some implementations.

FIG. 2C is a diagram illustrating an example user interface that enables a user to specify a type of displayed character, in accordance with some implementations.

In this illustrative example, the user interface (285) includes endpoints (290, 292, 294) representative of different representations of a displayed character. A display area associated with the user interface includes a depiction of three or more endpoints (vertices). Each endpoint is associated with a corresponding type of character. In some implementations, the user interface is displayed, e.g. on an output device such as a display that is associated with user device 110. The user provides input using an input device that is associated with user device 110. The input is indicative of a particular look for the displayed character by selecting a position (296) within an area defined by lines that connect adjacent endpoints. In some implementations, the position selected by the user may be highlighted on the display to provide feedback to the user.

In some implementations, an icon representative of the corresponding type of character may be displayed near one or more of the endpoints. In some implementations, an image of the character type may be displayed near the endpoint.

In some implementations, the user may indicate the position by utilizing a touchscreen provided on a display of a user device, by performing a moving and clicking operation using a mouse or pointing device, by performing a gesture, by spoken input, or other input mechanisms.

In some implementations, three endpoints may be used as illustrated in FIG. 2C. In some implementations, four, five, or greater than five endpoints may be used, each of which may be representative of different representations of the displayed character.

In some implementations, adjacent endpoints may be connected by straight lines. In some implementations, curved lines may be utilized to connect adjacent endpoints. In these implementations, the curved lines may be concave or convex. User selection of a point closer to the lines may cause a corresponding adjustment in the outer shape of the character, e.g., more vs. less bulge as compared to when the selection is a point on a straight line between the endpoints.

In some implementations, the user interface may be three-dimensional, the endpoints may be distributed in a three-dimensional space, and user input may be indicated by selection of a position within a volume defined by surfaces that connect the endpoints.

Figure 3A:
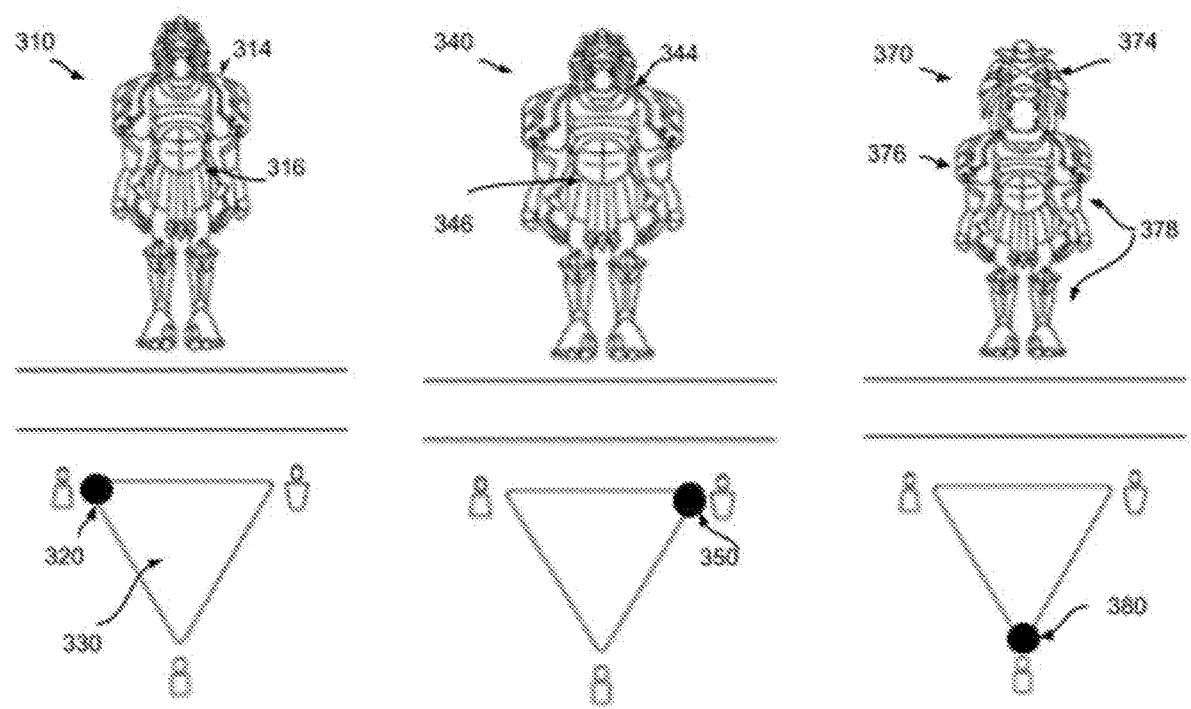
FIG. 3A illustrates an example interface with displayed characters and user input positions at corresponding endpoints.

FIG. 3A illustrates an example interface with displayed characters and user input positions at corresponding endpoints.

Characters may be of various types and forms, including humanoid, blocky, animal based, based on fictional characters, etc.

In this illustrative example, humanoid (anthro-male and anthro-female) and blocky (minifig) characters are depicted to demonstrate techniques of this disclosure. Corresponding endpoints on a user interface, as explained earlier with reference to FIG. 2C, are also depicted.

In some implementations, an anthro-male character may be depicted in a human-like character and with masculine features. In some implementations, masculine features may include wider shoulders and narrower hips. In some implementations, the anthro-female character may include a human like character with feminine features. In some implementations, the feminine features may include narrower shoulders and wider hips than an anthro-male character. In some implementations, the anthro-female character may be smaller in height than an anthro-male character.

In some implementations, a minifig character may be depicted as a blocky style character. The features of the minifig may include a larger sized head, a shorter torso, and shorter limbs (arms and legs).

In FIG. 3A, the leftmost figure depicts an anthro-female character (310), characterized by narrow shoulders (314) and broad hips (316). The character corresponds to the top left corner endpoint (320) of the input area in the user interface.

In FIG. 3A, the middle figure depicts an anthro-male character (340), characterized by broad shoulders (344) and narrow hips (346). The character corresponds to the top right corner endpoint (350) of the input area in the user interface.

In FIG. 3A, the rightmost figure depicts a minifig character (370), characterized by a large head (374), a short torso (376) and short limbs (378). The character corresponds to the top right corner endpoint (380) of the input area in the user interface.

In this illustrative example, the user interface (330) includes endpoints that correspond to different representations of a character. For example, the user interface includes endpoints representative of the anthro-female character (310), a male anthro character (340), and a minifig character (370). As can be seen in FIG. 3A, other aspects of the character, e.g., clothing, headgear, etc. retain properties such as color, texture, material, etc. and are adjusted only based on a change in dimension of the character, e.g., the larger head of the minifig character, broader shoulders of the anthro-male character, wider hips of the anthro-female character, etc.

Figure 3B:
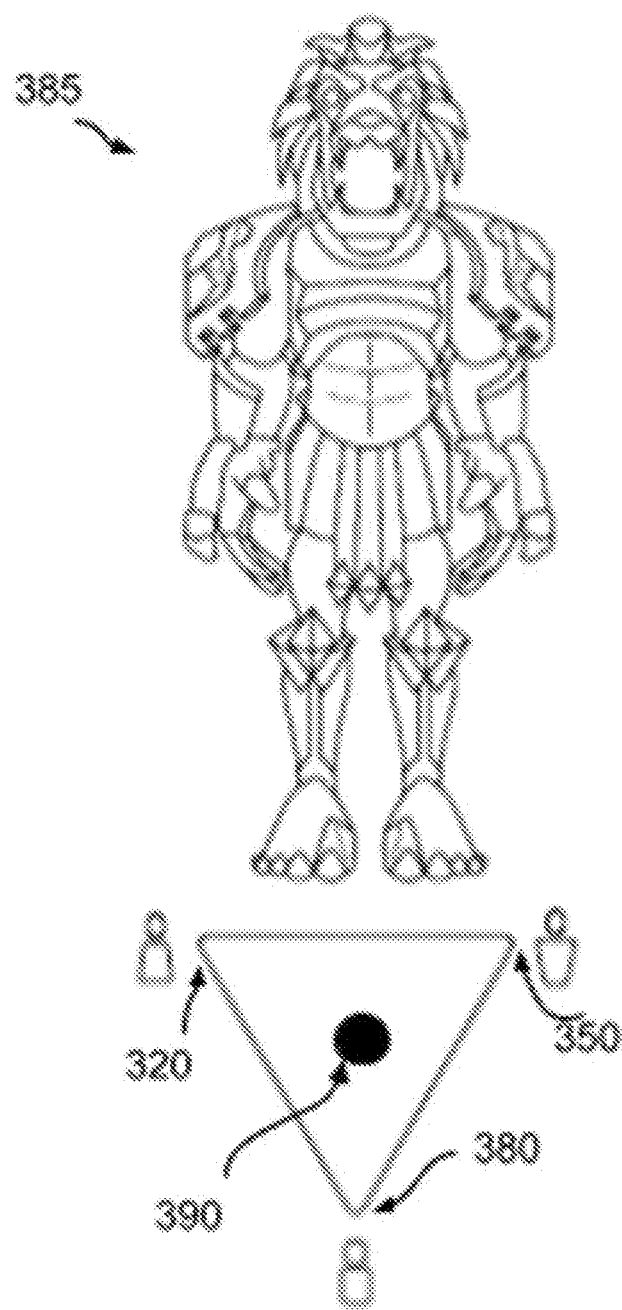
FIG. 3B illustrates a displayed character at an example user selected user input position, in accordance with some implementations.

FIG. 3B illustrates a displayed character at an example user selected user input position, in accordance with some implementations. In this illustrated example, the user has provided input indicative of a particular look for the character by selecting a position (390). The display area may also include a preview area in which a preview of the character is provided that matches a user-selected position.

In this illustrative example, the user indicated position is substantially equidistant from the three endpoints 320, 350, and 380. Consequently, the selected (and depicted) character (385) is a blended combination of an anthro-female character, an anthro-male character, and a minifig character. The blended character is an interpolation of the three characters. For example, the head of the blended character has a size that is an average of the three characters. In some implementations, the size may be a simple average or a weighted average. In some implementations, the weight for a character feature may be based on a distance from each respective endpoint. Other parameters such as shoulder to hip ratio, height, etc. may also be determined in a similar manner.

Figure 4:
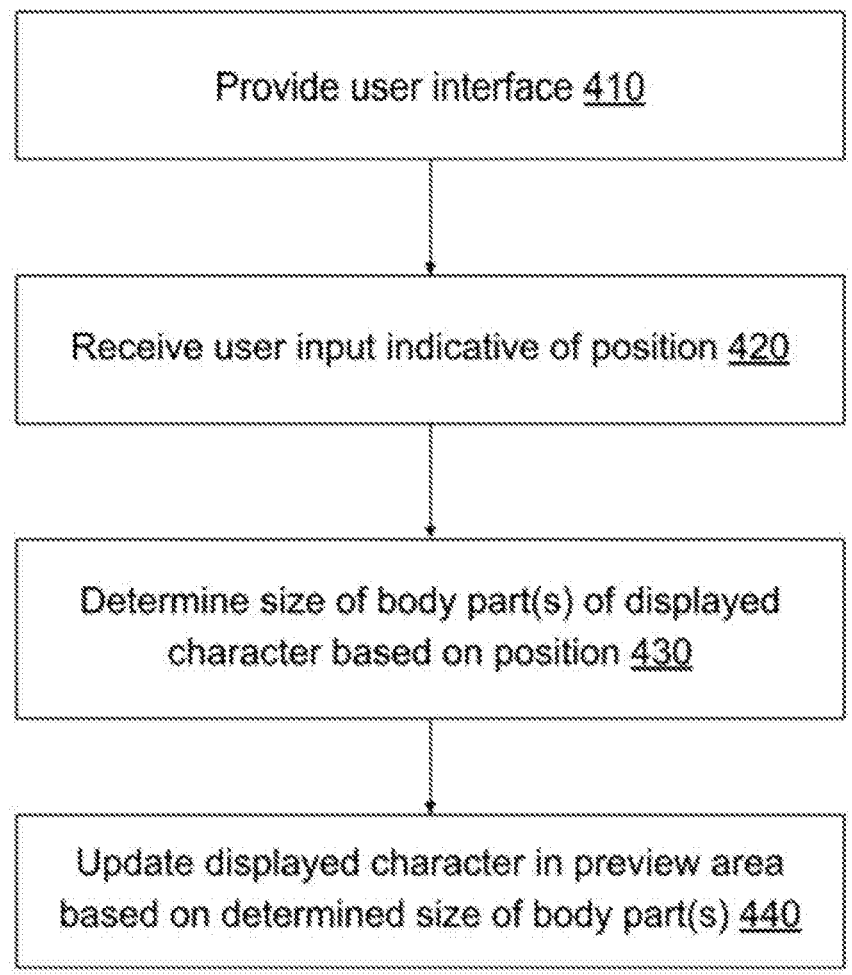
FIG. 4 is a flowchart illustrating an example method to modify a character, in accordance with some implementations.

FIG. 4 is a flowchart illustrating an example method 400 to modify a character, in accordance with some implementations.

Processing begins at block 410, where a user interface (UI) is provided. The UI is configured to enable a user to provide user input to scale a character. The UI may provide visual feedback to the user via for example, a display. In different implementations, the UI may include mechanisms for a user to provide input indicative of a position. For example, the user input may be received as touch input via a touchscreen of a client device 110, as gesture input via gesture detection hardware of client device 110, as voice input via a microphone of client device 110, via mouse or other pointing device of client device 110, or other suitable input mechanisms.

In some implementations, the display area associated with the user interface includes a depiction of three or more endpoints (vertices). Each endpoint of the endpoints is associated with a corresponding type of character. In some implementations, an icon representative of the corresponding type of character may be displayed near the endpoint. In some implementations, an image or stylized representation of the character type may be displayed near the endpoint.

In some implementations, adjacent endpoints are connected by lines to enclose an input area. In some implementations, adjacent endpoints are connected by straight lines.

In some implementations, three endpoints are utilized and the input area is defined by a triangle. In these implementations, each vertex of the triangle corresponds to a respective endpoint and is associated with a corresponding character type. In some implementations, a first endpoint may be associated with an anthro-female character, a second endpoint may be associated with an anthro-male character, and a third endpoint may be associated with a minifig character. In these implementations, user selection of a position that matches the particular endpoint is indicative of selection of the corresponding character.

The display area may also include a preview area in which a preview of the character is provided that matches a user-selected position. A displayed character may be a humanoid character, and include body parts such as a head, a torso, left arm, right arm, left leg, or right leg of the humanoid character. In some implementations, the character may be modeled as a three-dimensional model that connects body parts in a skeletal rig with a number of joints. In some implementations, 15 joints may be provided in the skeletal rig. A size of the body parts (for example, head size, arm length, etc.) may be defined by a user for each of the endpoints during set-up or initialization. Processing continues to block 420.

At block 420, user input is received indicative of a particular position within the input area. The user input may be provided by a user by utilizing the user interface (for example, utilizing the user interface 285 depicted in FIG. 2C). In some implementations, the user may provide user input using a touchscreen by the movement and/or contact of one or more fingers on a screen. In some implementations, user input may be provided by the movement of a cursor to a particular position. Processing continues to block 430.

At block 430, a size of body part(s) of the character is determined based on the received position. In some implementations, the size (length, girth, etc.) of the body parts are determined based on the user indicated position and may be based on a respective distance between the indicated position and each of the endpoints.

In some implementations, the size of the body part(s) may be determined by a process of interpolation (e.g., linear interpolation, non-linear interpolation, etc.) between the size of the body part(s) at corresponding endpoints. For example, for any user-indicated position that lies along any of the edges of the triangular user interface 285, interpolation is performed between two characters representing two endpoints connected by the edge. At other user-indicated locations, inside the triangle, interpolation is performed between relative sizes of body parts of the characters corresponding to each of the endpoints.

In some implementations, the endpoints represent end states (typically defined by the user and/or derived from default settings) for the characters, e.g. anthro-male, anthro female, and minifig, and all other user-indicated positions are intermediate states that are an average of the 3 end states. In some implementations, the intermediate states may be a weighted average of the 3 end states.

In some implementations, a linear weighting function of the distance may be utilized. For example, dimensions of a depicted muscle mass of the arms and legs may be based on a weighted average of the dimensions of muscle mass of the arms and legs provided for the 3 types of characters. Similarly, the length of limbs may be based on a weighted average of the length of the limbs provided for the 3 types of characters.

Based on the user-indicated position, an arm in a displayed character may be rendered by determining a distance between upper arm and lower arm (for example, upper left arm and lower left arm) points of the 15 point rig based on the position selected by the user (using reference arm lengths for the endpoints, e.g. length of an anthro-female may be 1, anthro-male may be 1.2, and 0.8 for minifig). The arm length of the displayed character, therefore, may be determined using the reference arm lengths and the distance of the user indicated position from the corresponding endpoints.

Similarly, muscle mass may be distributed in the shoulder-elbow region of the displayed character based on the user indicated position. For example, the displayed character may include a greater muscle mass if the user indicated position lies on the side of the triangle closer to the endpoint corresponding to an anthro-male (the right side as viewed) than if it lies on the side of the triangle closer to an anthro-female endpoint (the left side as viewed).

In some implementations, a size of a body part at the user indicated position may be determined based on a weighted average of a body part size associated with each endpoint.

In some implementations, a simple average of the respective weighted sizes for each of the endpoints.

In some implementations, a non-linear weighting of the distance may be utilized. In some implementations, the weighting of the distance may be illustrated in the triangle, e.g. by a gradient fill. In some implementations, higher weights may be associated with points closer to endpoints.

In some implementations, the size of the body parts at a previous user-indicated position (for example, a last indicated position) may be utilized as a basis to determine the size of the body parts at the current user-indicated position. The size of the body parts at the user-indicated position is determined based on a distance between the user-indicated position and the previous position and the size of the body parts at the previous position. This may enable a faster determination of the size of the body parts (as compared to direct computation based on reference sizes at the end points) and may be provide a sufficiently accurate determination for small movements of user indicated positions.

In some implementations, body part sizes associated with predetermined position(s) within the input area are determined and stored. In some implementations, the body part sizes for a set of position(s) may be stored as a look-up table (for example, stored in data store 120 illustrated in FIG. 1). For example, such storage may provide a technical benefit by eliminating the need perform an interpolation calculation, and instead, determining the character properties by a database lookup operation, which is less computationally expensive.

In some implementations, the size of the body parts at the user-indicated position is determined based on a distance between the user-indicated position and the predetermined position(s) and the size of the body parts at the predetermined positions.

In some implementations, the determined size of the one or more body parts of the displayed character is stored in a memory (for example, stored in data store 120 for subsequent retrieval and use).

Processing continues to block 440.

At block 440, the displayed character is updated in the preview area based on the determined size of body part(s). In some implementations, texture(s), body elements, clothing, etc. depicted on the displayed character are also updated. In some implementations, the update may include a determination an updated size of texture(s), body elements, clothing, etc.

In some implementations, a lightness transition or a color transition may be adjusted to create a smooth transition of texture as the displayed character is adjusted based on received user input via the user interface.

In some implementations, one or more accessories associated with the displayed character may also be adjusted in size based on the updation of the displayed character. In some implementations, a user may be provided with an option to keep the size of the accessory invariant with the change in size of the displayed character.

Blocks 410-440 can be performed (or repeated) in a different order than described above and/or one or more steps can be omitted. For example, blocks 430 and 440 may be performed substantially simultaneously, e.g., to provide a real time preview of the updated character. For example, a real time preview may be provided as the user provides continuous input, e.g., by sliding a finger across a touchscreen, which can result in corresponding calculations and updates to displayed character in the preview area. In some implementations, certain blocks may be performed in multiple sub-blocks, e.g., block 430 may be performed by calculating the size of each body part separately and then combining the calculated sizes into a character.

FIGS. 5A, 5B, and 5C illustrate additional positions indicated by user input and corresponding displayed characters, according to some implementations.

In this illustrative example, characters are depicted that represent the displayed character at midpoints of edges connecting adjacent endpoints. For example, in FIG. 5A, character 510 is a displayed character corresponding to user indicated position 520. Character 510 lies at a midpoint of the edge connecting endpoints corresponding to an anthro-male character and an anthro-female character. Accordingly, the displayed character includes dimensions for body part(s) that represent an average of the dimensions for the body part(s) in anthro-male and anthro-female characters. Dimensions of body part(s) for a minifig (for example, exaggerated head size) are not considered in determining the dimension of character 510.

Analogously, in FIG. 5B, character 540 is a displayed character corresponding to user indicated position 550. Character 540 lies at a midpoint of the edge connecting endpoints corresponding to a minifig character and an anthro-female character. Consequently, the displayed character includes dimensions for body part(s) that represent an average of the dimensions for the body part(s) in a minifig character and an anthro-female character. Dimensions of body part(s) for an anthro-male (for example, large shoulders) are not considered in determining the dimension of character 540.

In FIG. 5C, character 570 is a displayed character corresponding to user indicated position 580. Character 570 lies at a midpoint of the edge connecting endpoints corresponding to a minifig character and an anthro-male character. Consequently, the displayed character includes dimensions for body part(s) that represent an average of the respective dimensions for the body part(s) in a minifig character and an anthro-male character. Dimensions of body part(s) for an anthro-female (for example, wide hips) are not considered in determining the dimension of character 540.

As described earlier, dimensions of body part(s) at positions representing the midpoints of edges that connect adjacent endpoints (520, 550, and 580) may be pre-computed and stored. In some implementations, the stored dimensions at these and other predetermined positions may be utilized to speed up the rendering of displayed characters at these positions and positions determined to be within a predetermined distance from the predetermined positions.

In some implementations, the stored dimensions at these and other predetermined positions may be utilized to speed up the rendering of displayed characters at user input positions by providing additional reference points (in addition to the endpoints) by enabling faster computation of dimensions of body part(s) at a particular user input position.

Figure 6A:
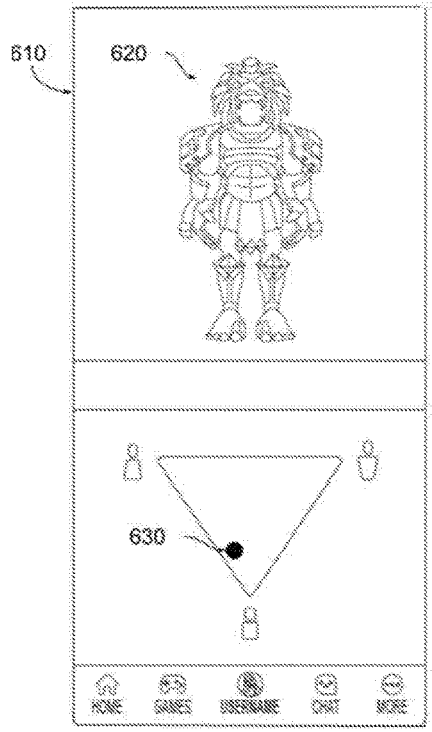
FIG. 6A, 6B, and 6C illustrate a transition from one displayed character to another, corresponding to received user input, in accordance with some implementations.
Figure 6B:
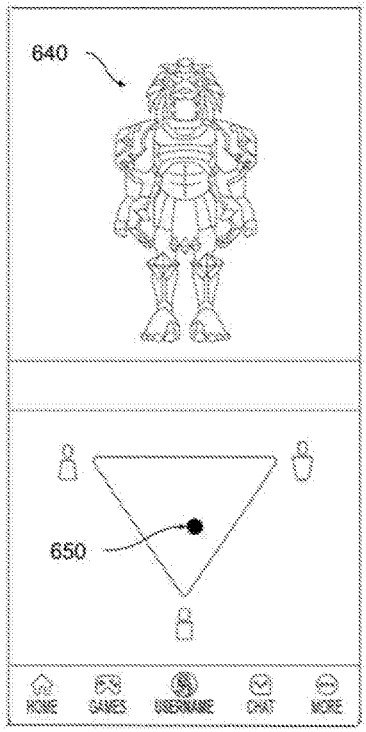
Figure 6C:
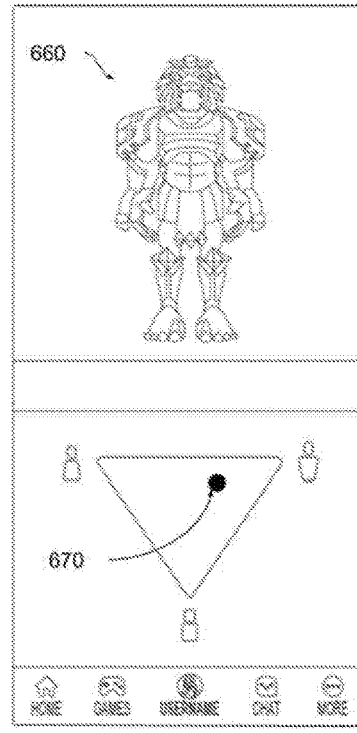

FIG. 6A, 6B, and 6C illustrate a transition from one displayed character to another, corresponding to received user input, in accordance with some implementations.

In this illustrative example, a user device 610 (similar to client device 110 described with respect to FIG. 1) is utilized to adjust the size of a displayed character, per techniques of this disclosure.

In FIG. 6A, an initial user indicated position 630 is provided, causing character 620 to be displayed on a screen of user device 610. It can be appreciated that since position 630 is in close proximity to endpoint corresponding to a minifig character, the displayed character is similar to a minifig (for example, as depicted as character 370 in FIG. 3A).

In FIG. 6B, the user indicates user indicated position 650 (for example, by moving their finger across a touchscreen of user device 610), causing character 640 to be displayed on a screen of user device 610.

In FIG. 6C, the user indicates user indicated position 670, causing character 660 to be displayed on a screen of user device 610. Since position 670 is in close proximity to endpoint corresponding to an anthro-male character, the displayed character is similar to an anthro-male character (for example, as depicted as character 340 in FIG. 3A).

In some implementations, in response to a shift in user indicated position from one to another, two or more displayed characters may be displayed in a transient manner (for example, by displaying them in an intermittent manner) to enable a user to make a selection of a preferred displayed character.

Figure 7:
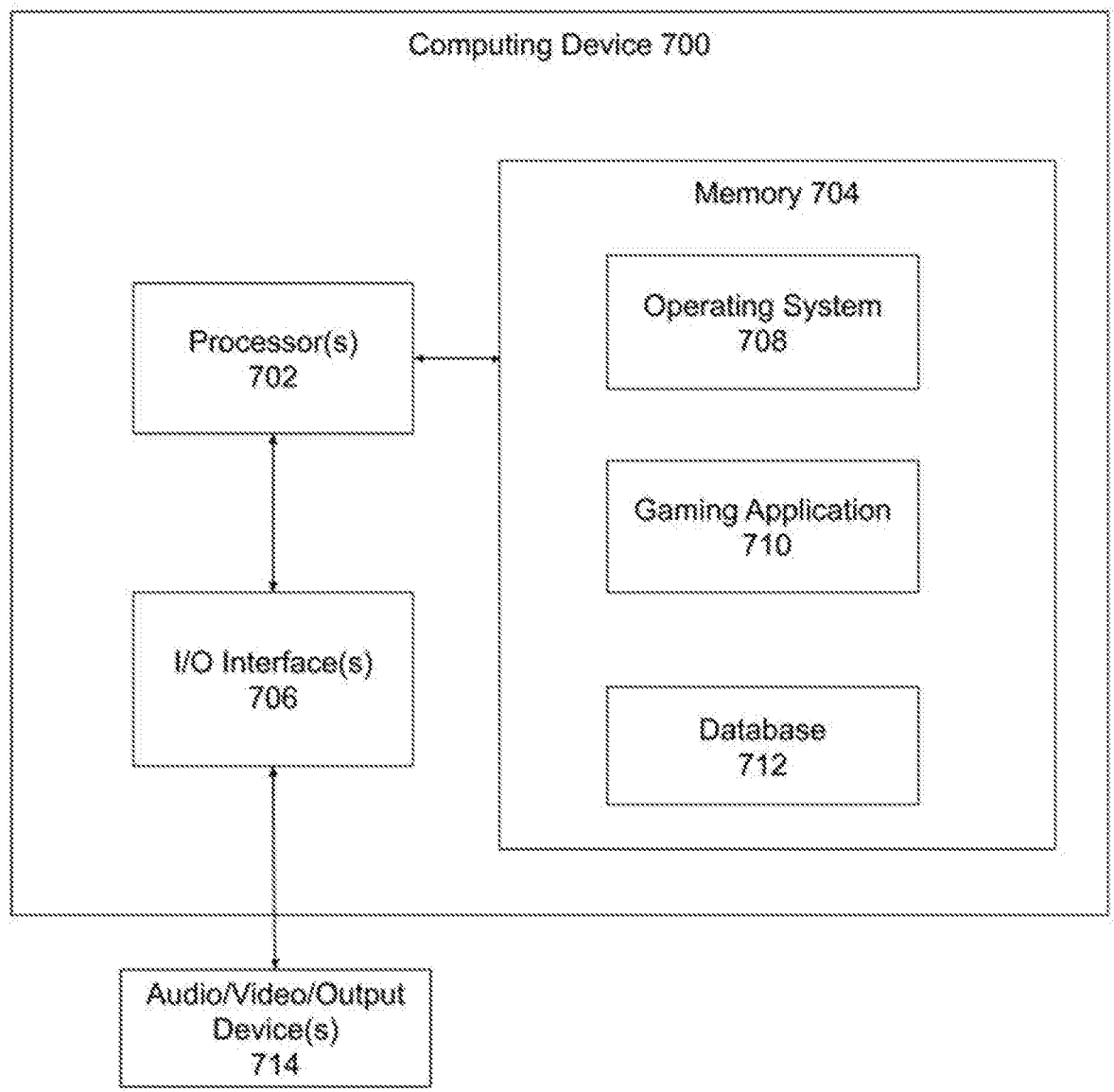
FIG. 7 is a block diagram illustrating an exemplary computing device, in accordance with some implementations.

FIG. 7 is a block diagram of an example computing device 700 which may be used to implement one or more features described herein. In one example, device 700 may be used to implement a computer device, (e.g., 102 and/or 110 of FIG. 1), and perform appropriate method implementations described herein. Computing device 700 can be any suitable computer system, server, or other electronic or hardware device. For example, the computing device 700 can be a mainframe computer, desktop computer, workstation, portable computer, or electronic device (portable device, mobile device, cell phone, smartphone, tablet computer, television, TV set top box, personal digital assistant (PDA), media player, game device, wearable device, etc.). In some implementations, device 700 includes a processor 702, a memory 706, input/output (I/O) interface 706, and audio/video input/output devices 714.

Processor 702 can be one or more processors and/or processing circuits to execute program code and control basic operations of the device 700. A "processor" includes any suitable hardware and/or software system, mechanism or component that processes data, signals or other information. A processor may include a system with a general-purpose central processing unit (CPU), multiple processing units, dedicated circuitry for achieving functionality, or other systems.

Processing need not be limited to a particular geographic location, or have temporal limitations. For example, a processor may perform its functions in "real-time," "offline," in a "batch mode," etc. Portions of processing may be performed at different times and at different locations, by different (or the same) processing systems. A computer may be any processor in communication with a memory.

Memory 704 is typically provided in device 700 for access by the processor 02, and may be any suitable processor-readable storage medium, e.g., random access memory (RAM), read-only memory (ROM), Electrical Erasable Read-only Memory (EEPROM), Flash memory, etc., suitable for storing instructions for execution by the processor, and located separate from processor 702 and/or integrated therewith. Memory 704 can store software operating on the server device 700 by the processor 702, including an operating system 708, one or more applications 710, e.g., an audio spatialization application and application data 712. In some implementations, application 710 can include instructions that enable processor 702 to perform the functions described herein, e.g., some or all of the method of FIG. 3.

For example, applications 710 can include an audio spatialization module 712, which as described herein can provide audio spatialization within an online gaming server (e.g., 102). Any of software in memory 704 can alternatively be stored on any other suitable storage location or computer-readable medium. In addition, memory 704 (and/or other connected storage device(s)) can store instructions and data used in the features described herein. Memory 704 and any other type of storage (magnetic disk, optical disk, magnetic tape, or other tangible media) can be considered "storage" or "storage devices."

I/O interface 706 can provide functions to enable interfacing the server device 700 with other systems and devices. For example, network communication devices, storage devices (e.g., memory and/or data store 108), and input/output devices can communicate via interface 706. In some implementations, the I/O interface can connect to interface devices including input devices (keyboard, pointing device, touchscreen, microphone, camera, scanner, etc.) and/or output devices (display device, speaker devices, printer, motor, etc.).

The audio/video input/output devices 714 can include a user input device (e.g., a mouse, etc.) that can be used to receive user input, a display device (e.g., screen, monitor, etc.) and/or a combined input and display device, that can be used to provide graphical and/or visual output such as the display output of step 340 of FIG. 3.

For ease of illustration, FIG. 7 shows one block for each of processor 702, memory 704, I/O interface 706, and software blocks 708 and 710. These blocks may represent one or more processors or processing circuitries, operating systems, memories, I/O interfaces, applications, and/or software engines. In other implementations, device 700 may not have all of the components shown and/or may have other elements including other types of elements instead of, or in addition to, those shown herein. While the online gaming server 102 is described as performing operations as described in some implementations herein, any suitable component or combination of components of online gaming server 102 or similar system, or any suitable processor or processors associated with such a system, may perform the operations described.

A user device can also implement and/or be used with features described herein. Example user devices can be computer devices including some similar components as the device 700, e.g., processor(s) 702, memory 704, and I/O interface 706. An operating system, software and applications suitable for the client device can be provided in memory and used by the processor. The I/O interface for a client device can be connected to network communication devices, as well as to input and output devices, e.g., a microphone for capturing sound, a camera for capturing images or video, a mouse for capturing user input, a gesture device for recognizing a user gesture, a touchscreen to detect user input, audio speaker devices for outputting sound, a display device for outputting images or video, or other output devices. A display device within the audio/video input/output devices 714, for example, can be connected to (or included in) the device 700 to display images pre- and post-processing as described herein, where such display device can include any suitable display device, e.g., an LCD, LED, or plasma display screen, CRT, television, monitor, touchscreen, 3-D display screen, projector, or other visual display device. Some implementations can provide an audio output device, e.g., voice output or synthesis that speaks text.

One or more methods described herein (e.g., method 400) can be implemented by computer program instructions or code, which can be executed on a computer. For example, the code can be implemented by one or more digital processors (e.g., microprocessors or other processing circuitry), and can be stored on a computer program product including a non-transitory computer readable medium (e.g., storage medium), e.g., a magnetic, optical, electromagnetic, or semiconductor storage medium, including semiconductor or solid state memory, magnetic tape, a removable computer diskette, a random access memory (RAM), a read-only memory (ROM), flash memory, a rigid magnetic disk, an optical disk, a solid-state memory drive, etc. The program instructions can also be contained in, and provided as, an electronic signal, for example in the form of software as a service (SaaS) delivered from a server (e.g., a distributed system and/or a cloud computing system). Alternatively, one or more methods can be implemented in hardware (logic gates, etc.), or in a combination of hardware and software. Example hardware can be programmable processors (e.g. Field-Programmable Gate Array (FPGA), Complex Programmable Logic Device), general purpose processors, graphics processors, Application Specific Integrated Circuits (ASICs), and the like. One or more methods can be performed as part of or component of an application running on the system, or as an application or software running in conjunction with other applications and operating system.

One or more methods described herein can be run in a standalone program that can be run on any type of computing device, a program run on a web browser, a mobile application ("app") run on a mobile computing device (e.g., cell phone, smart phone, tablet computer, wearable device (wristwatch, armband, jewelry, headwear, goggles, glasses, etc.), laptop computer, etc.). In one example, a client/server architecture can be used, e.g., a mobile computing device (as a client device) sends user input data to a server device and receives from the server the final output data for output (e.g., for display). In another example, all computations can be performed within the mobile app (and/or other apps) on the mobile computing device. In another example, computations can be split between the mobile computing device and one or more server devices.

Although the description has been described with respect to particular implementations thereof, these particular implementations are merely illustrative, and not restrictive. Concepts illustrated in the examples may be applied to other examples and implementations.

Note that the functional blocks, operations, features, methods, devices, and systems described in the present disclosure may be integrated or divided into different combinations of systems, devices, and functional blocks as would be known to those skilled in the art. Any suitable programming language and programming techniques may be used to implement the routines of particular implementations. Different programming techniques may be employed, e.g., procedural or object-oriented. The routines may execute on a single processing device or multiple processors. Although the steps, operations, or computations may be presented in a specific order, the order may be changed in different particular implementations. In some implementations, multiple steps or operations shown as sequential in this specification may be performed at the same time.

What is claimed is:

1. A computer-implemented method, the computer-implemented method comprising:
    providing a user interface that includes:
        at least three endpoints, wherein each endpoint of the at least three endpoints is associated with a corresponding type of character, each character having one or more body parts;
        an input area; and
        a character preview area;
    receiving user input at a particular position within the input area;
    in response to receiving the user input, determining a size of a body part of a custom character based on the particular position, by interpolation between a respective size of the body part of the character at each of the at least three endpoints; and
    causing the custom character to be displayed in the character preview area.

2. The computer-implemented method of claim 1, wherein the input area is defined by a triangle, and wherein each vertex of the triangle corresponds to a respective endpoint of the at least three endpoints.

3. The computer-implemented method of claim 1, wherein determining the size of the body part comprises determining the size of the body part based on a respective distance between the particular position and each of the at least three endpoints.

4. The computer-implemented method of claim 3, wherein determining the size of the body part comprises determining at least one of a length or a girth of the body part.

5. The computer-implemented method of claim 1, wherein the at least three endpoints include a first endpoint associated with an anthro-female character, a second endpoint associated with an anthro-male character, and a third endpoint associated with a minifig character.

6. The computer-implemented method of claim 1, wherein the receiving the user input comprises receiving the user input as one of a touch input, gesture input, voice input, or pointing device input.

7. The computer-implemented method of claim 1, wherein determining the size of a body part of a custom character based on the particular position, by interpolation between a respective size of the body part of the character at each of the at least three endpoints comprises determining the size of a body part of a custom character based on the particular position, by linear interpolation between a respective size of the body part of the character at each of the at least three endpoints.

8. The computer-implemented method of claim 1, wherein the custom character comprises the body part connected to other body parts in a three-dimensional rig.

9. The computer-implemented method of claim 1, wherein determining a size of the body part of the custom character based on the particular position comprises:
- determining a distance between the particular position and a previous position from prior user input in the input area; and
- determining the size of the body part of the custom character based on the distance and a size of the body part of the custom character corresponding to the previous position.

10. The computer-implemented method of claim 1, wherein determining the size of the body part of the custom character comprises:
- determining a respective distance between the particular position and each of the endpoints; and
- determining the size of the body part based on a weighted average of a respective size of the body part of the respective type of character associated with each endpoint.

11. The computer-implemented method of claim 10, further comprising:
- calculating a respective weighted size associated with each endpoint based on a respective distance between the particular position and the endpoint; and
- calculating the weighted average as a simple average of the respective weighted size associated with each endpoint.

12. A system comprising:
- a memory with instructions stored thereon; and
- a processing device, coupled to the memory, the processing device configured to access the memory and execute the instructions, wherein the instructions cause the processing device to perform operations including:
  - providing a user interface that includes:
    - at least three endpoints, wherein each endpoint of the at least three endpoints is associated with a corresponding type of character, each character having one or more body parts;
    - an input area; and
    - a character preview area;
  - receiving user input at a particular position within the input area;
  - in response to receiving the user input, determining a size of a body part of a custom character based on the particular position, by interpolation between a respective size of the body part of the character at each of the at least three endpoints; and
  - causing the custom character to be displayed in the character preview area.

13. The system of claim 12, wherein the operation of determining the size of the body part based on the particular position comprises selecting a respective size of the body part based on a respective distance between the particular position and the at least three endpoints.

14. The system of claim 12, wherein the at least three endpoints include a first endpoint associated with an anthro-female character, a second endpoint associated with an anthro-male character, and a third endpoint associated with a minifig character.

15. The system of claim 12, wherein the input area is defined by a triangle, and wherein each vertex of the triangle corresponds to a respective endpoint of the at least three endpoints.

16. A non-transitory computer-readable medium comprising instructions that, responsive to execution by a processing device, cause the processing device to perform operations comprising:
- providing a user interface that includes:
  - at least three endpoints, wherein each endpoint of the at least three endpoints is associated with a corresponding type of character, each character having one or more body parts;
  - an input area; and
  - a character preview area;
- receiving user input at a particular position within the input area;
- in response to receiving the user input, determining a size of a body part of a custom character based on the particular position, by interpolation between a respective size of the body part of the character at each of the at least three endpoints; and
- causing the custom character to be displayed in the character preview area.

17. The non-transitory computer-readable medium of claim 16, wherein the operation of determining the size of the body part of the custom character comprises:
- determining a respective distance between the particular position and each of the endpoints; and
- determining the size of the body part based on a weighted average of a respective size of the body part of the respective type of character associated with each endpoint.

18. The non-transitory computer-readable medium of claim 16, wherein the input area is defined by a triangle, and wherein each vertex of the triangle corresponds to a respective endpoint of the at least three endpoints.

19. The non-transitory computer-readable medium of claim 16, wherein the at least three endpoints include a first endpoint associated with an anthro-female character, a second endpoint associated with an anthro-male character, and a third endpoint associated with a minifig character.

20. The non-transitory computer-readable medium of claim 16, wherein the custom character comprises the body part connected to other body parts in a three-dimensional rig.

* * * * *